UNITED STATES PATENT OFFICE.

HUGO ERDMANN AND ERNST ERDMANN, OF HALLE-ON-THE-SAALE, GERMANY, ASSIGNORS TO THE ACTIEN-GESELLSCHAFT FÜR ANILIN FABRIKATION, OF BERLIN, GERMANY.

METHYL ETHER OF ANTHRANILIC ACID AND PROCESS OF MAKING SAME.

SPECIFICATION forming part of Letters Patent No. 658,769, dated October 2, 1900.

Application filed November 11, 1898. Serial No. 696,160. (Specimens.)

*To all whom it may concern:*

Be it known that we, HUGO ERDMANN and ERNST ERDMANN, of Halle-on-the-Saale, in the Kingdom of Prussia, German Empire, have invented new and useful Improvements in Methyl Ether of Anthranilic Acid; and we do hereby declare that the following is a full, clear, and exact description of the invention, which will enable others skilled in the art to which it appertains to make and use the same.

By the action of methyl alcohol on isatoic acid G. Schmidt (*Journal für Praktische Chemie*, Vol. 2, pp. 36 and 374) obtained as an accessory product a yellow-colored liquid, which he found to possess the composition of a methyl ether of anthranilic (orthoamidobenzoic) acid. It appears, however, that this product cannot have been pure anthranilic methyl ether. This follows from the following observations: We have succeeded in obtaining the said ether in a chemically-pure form by a new process and we have found its properties to differ essentially from those of Schmidt's product. While Schmidt's product is described as a yellow oil, the compound obtained by us is at ordinary temperature a solid substance, forming nearly colorless crystals. The new product is, moreover, characterized by its sweet and intense smell, which resembles that of orange-blossoms, and could not have escaped the attention of any chemist who got the product into his hands. It is therefore probable that Schmidt's product did either not contain the methyl ether of anthranilic acid at all or only in a state of great impurity.

The new process for the manufacture of pure methyl ether of anthranilic acid consists in treating the solution of anthranilic acid in methyl alcohol with acids, such as hydrochloric, sulfuric, phosphoric acid, or of strong organic acids.

The following example may serve to illustrate the new process: In a suitable vessel provided with an inverted condenser a solution of one kilogram anthranilic acid in five liters of methyl alcohol is saturated with gaseous hydrochloric acid. The formation of the methyl ether is accompanied by a considerable rise of temperature of the mixture, which at last begins to boil. It is allowed to stand for several hours. Then the larger part of the alcohol is distilled off on the water-bath. By addition of a solution of sodium carbonate to the residue the new ether is separated in the form of an oily liquid, which is washed with water and thereupon distilled *in vacuo*.

The methyl ether of anthranilic acid obtained in the manner described is represented by the following formula:

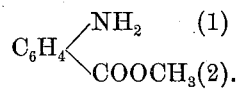

It forms colorless crystals of blue fluorescence, which melt at 23.5° centigrade and which, distilled *in vacuo* at a pressure of eleven millimeters, boil at 127° centigrade. The new ether dissolves easily in mineral acids, in alcohol, ether, and other organic solvents, but only sparingly in water. All its solutions show a beautiful blue fluorescence.

On treating the solution of the new compound in ether or benzene with gaseous hydrochloric acid the hydrochlorid of the methyl ether of anthranilic acid separates in the form of colorless needles, melting at 178° centigrade.

Having now described our invention, what we claim is—

1. The hereinbefore-described methyl ether of anthranilic acid prepared by the action of acids upon a solution of anthranilic acid in methyl alcohol, said ether possessing the constitution represented by the formula:

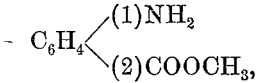

forming colorless crystals of blue fluorescence, which melt at 23.5° centigrade, dissolving easily in alcohol, ether, benzene and other organic solutions or oils, these solutions showing a beautiful blue fluorescence, being sparingly soluble in water, but dissolving readily in diluted mineral acids, said ether possessing an intense smell which resembles that of orange-blossoms.

2. The herein-described process for the manufacture of the methyl ether of anthranilic acid which consists in treating anthranilic acid with methyl alcohol and acids and separating the ether from the salt thus formed, by means of an alkali, substantially as set forth.

In witness whereof we have hereunto signed our names this 22d day of October, 1898, in the presence of two subscribing witnesses.

HUGO ERDMANN.
ERNST ERDMANN.

Witnesses:
RUDOLPH FRICKE,
MICHAEL LUX.